Sept. 3, 1963 E. R. BOWDEN 3,102,659
SAFETY RADIATOR CAP WITH SHIFTABLE LATCH
Filed Aug. 19, 1960 3 Sheets-Sheet 1

INVENTOR.
ELDRED R. BOWDEN
BY
Harold B. Hood
ATTORNEY

Sept. 3, 1963  E. R. BOWDEN  3,102,659
SAFETY RADIATOR CAP WITH SHIFTABLE LATCH
Filed Aug. 19, 1960  3 Sheets-Sheet 2

INVENTOR.
ELDRED R. BOWDEN
BY
Harold B. Hood
ATTORNEY

Sept. 3, 1963 E. R. BOWDEN 3,102,659
SAFETY RADIATOR CAP WITH SHIFTABLE LATCH
Filed Aug. 19, 1960 3 Sheets-Sheet 3

INVENTOR.
ELDRED R. BOWDEN
BY
Harold B. Hood
ATTORNEY

# United States Patent Office 3,102,659
Patented Sept. 3, 1963

3,102,659
SAFETY RADIATOR CAP WITH SHIFTABLE LATCH
Eldred R. Bowden, Connersville, Ind., assignor to Stant Manufacturing Company, Inc., Connersville, Ind., a corporation of Indiana
Filed Aug. 19, 1960, Ser. No. 50,781
5 Claims. (Cl. 220—40)

The present invention relates to a closure cap, primarily intended for use on the filler neck of the cooling system of a conventional automobile engine, said cap involving novel structure which is affirmatively effective to guard against a long-recognized hazard.

For many years, such cooling systems were conventionally designed to operate at atmospheric pressures; but even in those days, it sometimes happened, for one reason or another that the coolant in the system would attain a boiling temperature, thus producing a super-atmospheric pressure in the system. When, under those conditions, a vehicle operator or an attendant inattentively removed the closure cap from the filler neck of such a system, steam and scalding water would frequently spew forth, sometimes drenching and seriously injuring anyone in the immediate vicinity.

Today, most such systems are designed to operate under superatmospheric pressures of various values between about two pounds and about twenty pounds per square inch; and in such systems, of course, the probability of injury upon sudden removal of a closure cap is greatly increased.

For many years, the industry has sought a satisfactory cure for this hazard, but without substantial success. It is conventional now to construct the cooperating elements of the retainer means between the filler neck and the closure cap with an intermediate land or obstruction which, interposing a slight resistance to removal-rotation just before the cap is fully released from the neck, tends to remind an individual to delay complete removal of the cap so as to give the system time within which to vent its pressure to the atmosphere; but accidents of the above described type continue to occur though, perhaps, with less frequency.

According to the present invention, I provide positive latch means carried by the closure cap and effective affirmatively to arrest movement of the cap in a direction to release it from the filler neck, at an intermediate position in which the interior of the cooling system is open to the atmosphere through the conventional vent port with which the filler neck is provided, but in which the mouth of the filler neck is still closed by the cap to prevent egress of hot liquid or of any substantial amount of scalding vapor which might injure the individual who is manipulating the cap. The novel structure is so constructed and arranged as to require positive action by that individual, in addition to mere rotation of the cap, before the cap can be released from its closing engagement with the mouth of the filler neck.

The primary object of the present invention, then, is to provide a safety cap embodying shiftable latch means of the character above indicated which will guard even the most inattentive manipulator against injury by liquid or vapor spewing from a system which has been operating under superatmospheric pressure.

A further object of the invention is to provide, in such a cap, latch means which is resiliently biased to its motion-arresting position, but including manually manipulable means readily accessible to an operator whereby the latch may be retracted, by affirmative action, to permit removal of the cap.

A still further object of the invention is to provide such a structure in which the latch means is provided with a cam surface so constructed and arranged that the cap may be applied to a conventional filler neck and may be fully seated thereon without manual manipulation of the latch means by the operator.

Still another object of the present invention is to provide latch means of the character described which is supported from the cap and arranged for substantially radial movement with respect thereto between its motion-arresting position and its release position.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figures 1, 3:
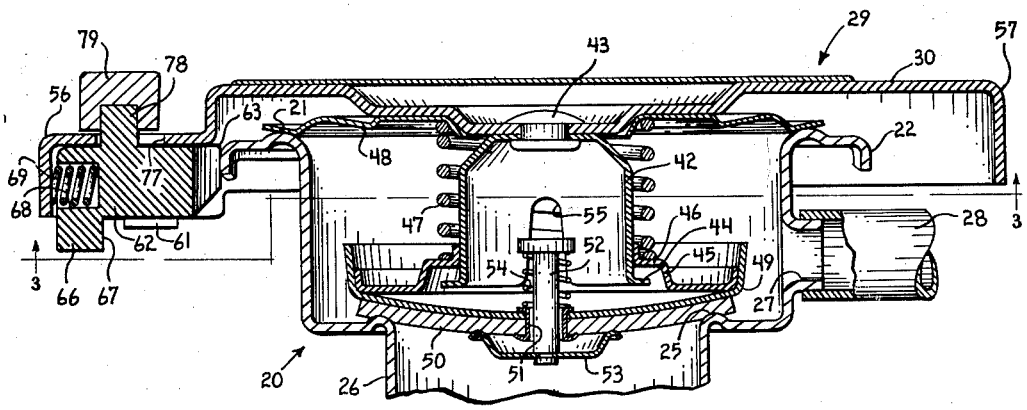
FIG. 1 is a vertical section through the distal portion of a conventional filler neck with a cap embodying one form of the present invention in fully seated position thereon.
FIG. 3 is a horizontal section taken substantially on the line 3—3 of FIG. 1.

Referring more particularly to the form of invention illustrated in FIGS. 1 to 5, it will be seen that I have shown the distal fragment of a conventional filler neck 20 having an upwardly opening mouth surrounded by a seat 21 and provided with a downturned, peripherally extending lip 22 which is formed, at its distal edge, with symmetrically arranged cam surfaces 23 and 24 inclining, in the direction of applying rotation of a filler cap, downwardly toward the level of the conventional pressure valve seat 25. The section 26 of the filler neck indicates any means whereby said filler neck is mounted upon, and communicates with the interior of, the conventional cooling system for an internal combustion engine.

In accordance with conventional practice, the filler neck 20 is provided with a vent port 27 disposed between the seats 21 and 25, and a conduit 28 conventionally leads from said port to any suitable point at which said conduit is in open communication with the atmosphere.

The reference numeral 29 indicates generally a pressure closure cap which, except in the particulars later to be described, conforms generally to the construction of currently conventional pressure closure caps. Said cap comprises a cap body 30 provided with a downturned, perimetral flange 31 whose distal edge carries, at diametrically opposed regions, a pair of retainer fingers 32 and 33 which, as will be seen, are offset from the plane of the cap body 30 and extend substantially radially with respect thereto.

In accordance with conventional practice, the lip 22 of the filler neck 20 is formed with diametrically opposed notches 34 and 35 through which the fingers 32 and 33 are enterable, whereupon turning movement of the cap in a clockwise direction as viewed from above (a counterclockwise direction as viewed in FIGS. 3, 4 and 5) will move said fingers 32 and 33 into cooperative engagement with the cam surfaces 23 and 24. Hereinafter, such turning movement of the cap relative to the filler neck will be referred to as "forward movement," while turning movement of the cap in a direction to return the fingers into registry with the notches 34 and 35 will be referred to as "rearward movement."

As shown, the distal edge of the lip 22 is formed with a slight downward projection 36 at the forward end of the notch 34, and with a shallow region 37, having a peripheral extent substantially equal to that of the finger 32, immediately forward with respect to said extension 36 and between said extension and the cam surface 23. This is the "land" or "obstruction" arrangement of conventional practice as described above, and is shown primarily for the purpose of indicating the applicability of the cap of the present invention to filler necks currently in wide use in the automobile industry. The forward end of the cam surface 23 is guarded by a longer downward projection 38 so arranged that, when the cap 29 attains full seating on the filler neck 20, the leading end of the finger 32 will be engaged and arrested by said projection 38.

A projection 39, a land 40 and a projection 41 are diametrically opposed, respectively to the projection 36, the land 37 and the projection 38 for similar cooperation with the finger 33.

A hollow dome or bell 42 is centrally suspended from the cap body 30 by means of a rivet 43 and is formed, at its lower end, with an outturned flange 44. A pan 45 is formed with a collar flange 46 which is loosely slidably mounted upon the dome 42. A spring 47 is confined between the collar flange 46 and a diaphragm 48 resiliently to resist movement of the pan 45 toward the cap body 30 and to urge the collar flange 46 into engagement with the dome flange 44. Said spring also supports the diaphragm 48 in position for engagement of the periphery of said diaphragm with the seat 21 surrounding the mouth of the filler neck 20.

A valve carrier 49 is fixed to the pan 45 and supports, on its lower face, a compressible gasket 50. The parts are so proportioned and arranged that, when the cap 29 is fully seated on the filler neck 20, the flange 44 is spaced below the collar flange 46 whereby the spring 47 resiliently presses the gasket 50 into sealing engagement with the pressure valve seat 25.

In the form of cap illustrated, the gasket 50 and valve carrier 49 are penetrated by a hollow rivet 51 in which is loosely guided the stem 52 of a vacuum-release valve 53 which is normally held in sealing contact with the gasket 50 by means of a spring 54. The interior of the dome 42 is in open communication with the vent port 27 through one or more slots 55.

The structure as thus far described is well known in the art.

Figure 4:
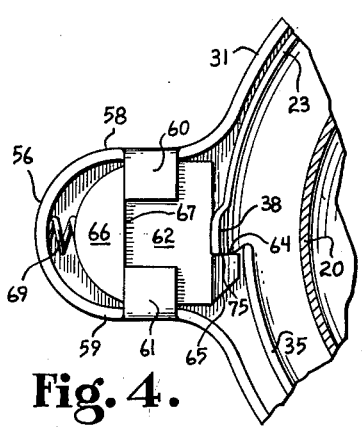
FIG. 4 is a fragmental section taken substantially on the line 4—4 of FIG. 2.
Figure 5:
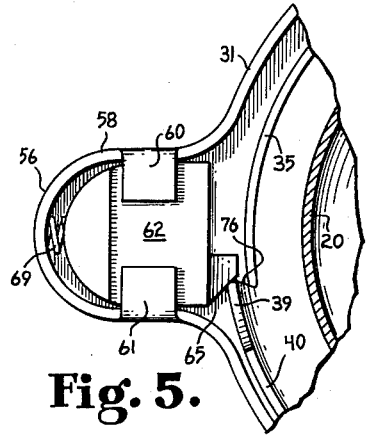
FIG. 5 is a fragmental section similar to FIG. 4 but showing the parts in a different position of adjustment.

The downturned flange 31 of the cap 29 is, in the illustrated embodiment of the invention, formed to provide a pair of diametrically opposed, radially projecting ears 56 and 57, the structure being such that, as is most clearly illustrated in FIGS. 3 to 5, the ear 56 includes a spaced pair of substantially radially arranged walls 58 and 59 providing a substantially radial guideway. The distal edges of the walls 58 and 59 carry, respectively, inturned fingers 60 and 61 which cooperate with the walls 58 and 59 to support and guide a latch member 62 for substantially radial movement relative to the cap body 30. Said latch element includes a portion 63 which is disposed at least partially in a plane between the plane of the cap body 30 and the offset fingers 32 and 33 and which is radially movable between a first position in which it radially traverses the circle in which the cam surfaces 23 and 24 are disposed and a second position in which said latch portion 63 is wholly offset from that circle. The rearward face 64 of the latch portion 63 is flatly radial with respect to the cap body, while the forward face 65 thereof inclines forwardly and in the direction of latch-retractive movement, as is most clearly to be seen in FIGS. 4 and 5.

Referring to FIG. 1, it will be seen that the major portion of the bottom face of the latch element 62 is slidably supported upon the fingers 60 and 61, but that the outermost end portion of the latch element is provided with a downwardly extending block 66 whose forward face 67 is engageable with the outward edges of said fingers to limit radially inward movement of the latch element under the influence of a spring 69 a portion of which is received within a pocket 68 in the latch element and the outer end of which bears against the inner surface of the flange 31 to urge the latch element toward its abovementioned first position.

It will now be seen that, when the fingers 32 and 33 are entered through the notches 34 and 35, respectively, the innermost end of the latch portion 63 will bear upon the outer surface of the lip 22 adjacent the shallow end of the cam surface 23. As the cap is now turned in a forward direction, the finger 32 will move past the extension 36, and as the trailing end 72 of the finger 32 passes the forward end 70 of the extension 36, the latch element 63 will move past the forward end 75 of the extension 38 and the latch will be moved radially inwardly by the spring 69 into the notch 35. Now, as forward movement of the cap is continued, the finger 32 will ride down the cam surface 23 and, before the forward end of the finger 32 comes into engagement with the projection 38, the camming surface 65 of the latch portion 63 will engage the rear end 76 of the extension 39, as illustrated in FIG. 5, whereby the latch element will be shifted radially outwardly to the position of FIG. 3 as the finger 32 comes into engagement with the projection 38.

Figure 2:
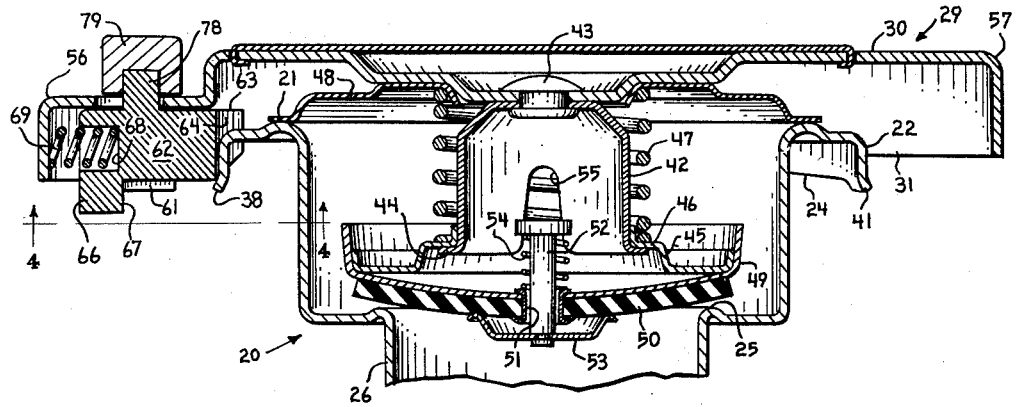
FIG. 2 is a similar section but showing the cap in intermediate, arrested position on the filler neck.

As the cap is turned in a rearward direction from the position of FIG. 3, the latch element 63 will drop off the extension 39 and into the notch 35 before the flange 44 has engaged the collar flange 46 to lift the gasket 50 off the seat 25, but as the rearward movement continues, the radial face 64 of the latch element 63 comes into positive abutment with the end 75 of the extension 38 substantially concurrently with the registry of the trailing end 72 of the finger 32 with the forward end 70 of the extension 36. Such engagement of the latch face 64 with the extension face 75 positively arrests rearward movement of the cap in a position in which the gasket 50 is off the seat 25, as shown in FIG. 2, and the interior of the cooling system is in open communication with the vent port 27. Further rearward movement of the cap to bring the fingers 32 and 33 into registry with the notches 34 and 35 is positively prevented until the manipulator has affirmatively shifted the latch element 62 radially outwardly, against the tendency of the spring 69, to move the latch element 63 to a position wholly outside the location of the extension 75. To facilitate such actuation of the latch element 62, the cap body is formed with a radially elongated slot 77 through which projects a post 78 integral with or fixed to the latch element, said post carrying, above the top surface of the cap body, a button 79.

FIGS. 6 to 10 illustrate a modified form of latch mechanism in the same general environment shown in FIGS. 1 to 5. The cap indicated generally by the reference numeral 89 is associated with the same filler neck 20 which is illustrated in FIGS. 1 to 5, and therefore the individual parts of the said filler neck, which are indicated by the same reference numerals in FIGS. 6 to 10, need not be here separately described.

The cap 89 comprises a cap body 90 having a perimetral, downturned flange 91 in substantially all respects similar to the corresponding parts of the cap 29. Like the cap 29, the cap 89 embodies parts 102 to 115 which are identical with the parts 42 to 55 of the embodiment illustrated in FIGS. 1 to 5, and the mode of operation of those parts, in the two embodiments, is identical.

In the form of invention illustrated in FIGS. 6 to 10, the flange 91 is formed to provide diametrically opposite, radially projecting ears 116 and 117, the ear 116 defining a spaced pair of substantially radially arranged walls 118 and 119; and generally in the region of that ear the cap body 90 supports a pair of radially-spaced rivets 120 which penetrate a slot 121 in a latch element 122 to support said latch element for substantially radial sliding movement with respect to the cap body. At a level disposed in a plane between the cap body 90 and the retainer fingers like the fingers 32 and 33, the latch element comprises a toe 123 the rear face 124 of which is flatly radial and the forward face 125 of which is inclined forwardly and in the direction of latch-retractive movement. A stem 128 is connected to the latch element 122 and is surrounded by a coiled spring 129 which is confined between the outer end of the latch element and the inner surface of the flange 91 adjacent the outermost portion of the ear 116. Said spring 129 yieldably urges the latch element 122 toward a position in which the toe 123 radially traverses the circle in which the cam surfaces 23 and 24 of the lip 22 are disposed; and the parts are so proportioned and designed that the latch element may be retracted, against the influence of the spring 129, to a position in which said toe is wholly offset from such circle.

Figure 6:
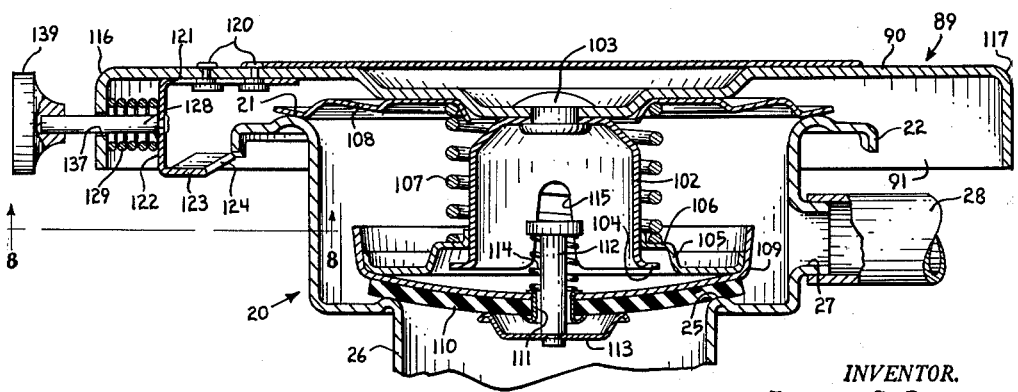
FIG. 6 is a section similar to FIG. 1 but showing a modified embodiment of my invention.
Figure 7:
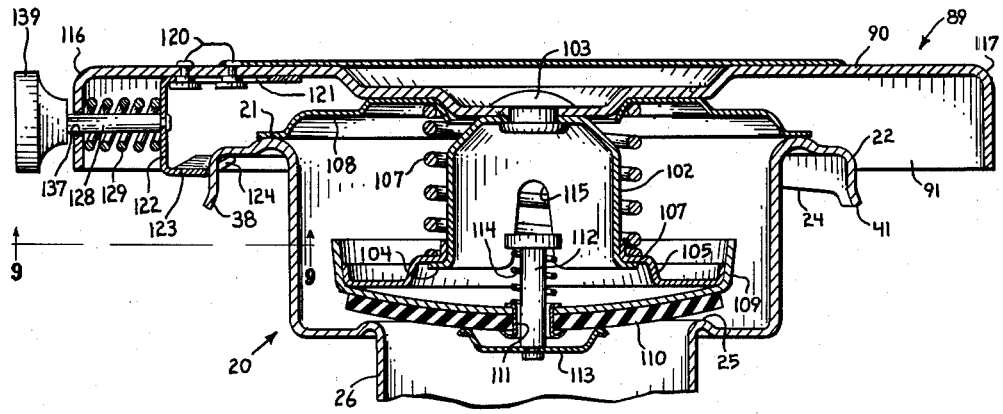
FIG. 7 is a section similar to FIG. 2 but showing the latter form of cap.

As is most clearly shown in FIGS. 6 and 7, the stem 128 penetrates a perforation 137 in the flange 91 and, at its distal end, carries a knob 139 accessible for manual manipulation, to retract the latch element, when the cap is in place on the filler neck.

The mode of operation of the form of invention illustrated in FIGS. 7 to 10 is directly comparable to that described in connection with the form illustrated in FIGS. 1 to 5. As the cap 89 is turned forwardly, after its retainer fingers have been entered through the filler neck notches 34 and 35, the latch toe 123 will pass the extension 38 and snap into the notch 35. As the finger corresponding to the finger 32 of FIG. 3 approaches the extension 38, the camming surface 125 of the toe 123 will engage the end 76 of the extension 39, in the manner illustrated in FIG. 10, to cause retraction of the latch element to the position of FIG. 8.

Figure 8:
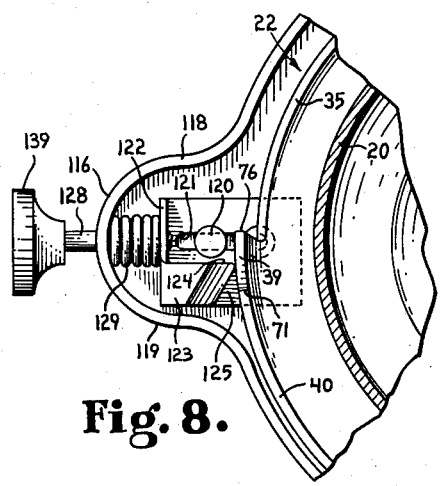
FIG. 8 is a fragmental, horizontal section taken substantially on the line 8—8 of FIG. 6.
Figure 9:
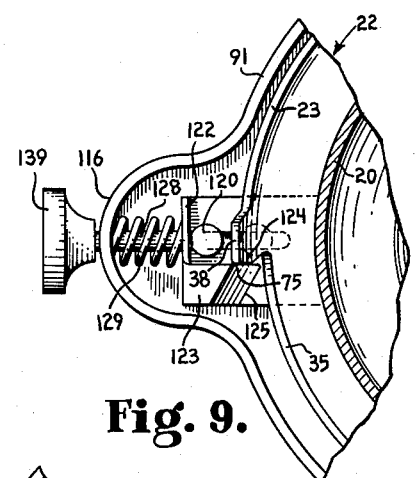
FIG. 9 is a fragmental section taken substantially on the line 9—9 of FIG. 7.
Figure 10:
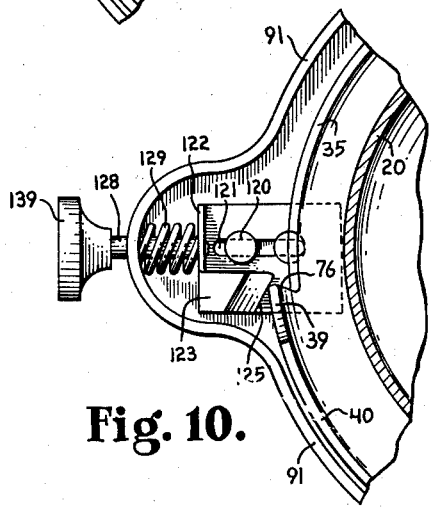
FIG. 10 is a similar, fragmental section but showing the parts in a different position of adjustment.

Upon rearward movement of the cap from the position of FIGS. 6 and 8 toward the position of FIGS. 7 and 9, the toe 123 will drop off the extension 39 into the notch 35 and, as the cap reaches a position corresponding to the position of FIG. 7, the flat surface 124 of the latch toe 123 will engage the surface 75 of the extension 38, positively to arrest further rearward movement of the cap before its retainer fingers can reach registry with the notches 34 and 35. Thus the operator is required actively to grasp, and pull radially outwardly upon, the knob 139 to retract the latch element 122 before he can continue rearward turning movement of the cap to a point at which the retainer fingers can be withdrawn through the notches 34 and 35.

I claim as my invention:

1. The combination with a filler neck of a fluid system designed to operate under superatmospheric pressure, said filler neck having a mouth, an internal valve seat facing said mouth, a peripherally-extending lip surrounding said mouth and providing a cam surface inclining toward said seat as it progresses peripherally in a forward direction, said lip being interrupted by a notch, and a vent port between said seat and said mouth, of a closure cap for said filler neck comprising a cap body constructed and arranged to close said mouth, a pressure valve suspended from said cap body for limited reciprocation toward and away from said body, spring means confined between said cap body and said valve and yieldably resisting movement of said valve toward said cap body, retainer means carried by said cap body adjacent the periphery thereof and having a portion offset from the plane of said body and extending substantially radially relative to the periphery of said body, said retainer means being enterable through said lip notch and thereupon engageable, by forward turning movement of said cap body, with said lip cam surface, said parts being so constructed and arranged that, when said retainer means is engaged with that portion of said cam surface nearest the level of said seat, said valve is sealingly engaged with said seat and when said retainer means is engaged with a portion of said cam surface nearer said notch, said valve is supported out of sealing engagement with said seat, and latch means supported on said cap body for radial movement relative thereto between a first position radially traversing the circle in which said cam surface lies and a second position radially offset from said circle, and spring means yieldably urging said latch means toward said first position, said latch means being so angularly spaced from said retainer means that, as said cap body is turned rearwardly from engagement with that portion of said cam surface nearest the level of said seat, said latch means will engage said lip at the rear edge of said notch to hold said body against further rearward turning movement, before said retainer means attains registry with said notch.

2. The combination of claim 1 in which the rearward face of said latch means is substantially radial relative to said cap body while the forward face thereof inclines forwardly and in the direction of latch movement toward said second position.

3. A closure cap comprising a cap body having a downturned, perimetral flange, said flange being formed to define a radially-outwardly projecting ear, an inturned retainer finger adjacent the distal edge of said flange engageable, upon turning movement, with a conventional filler neck lip to retain said body on such a neck, the peripheral midpoint of said finger being spaced approximately 90° from the peripheral center of said ear, a latch element received and guided within said ear for limited radial movement relative to said cap body, spring means housed in said ear and engaging said latch element and yieldably resisting radially outward movement thereof, and manually manipulable means operatively associated with said latch element and accessible from outside said cap body, whereby retrograde turning movement of said cap will be arrested until said latch element is manually retracted.

4. A closure cap comprising a cap body, flange means depending from said cap body and including an arcuate section substantially concentric with said body and carrying a substantially radially-extending retainer finger adjacent its distal edge, said retainer finger being engageable, upon turning movement, with a conventional filler neck lip to retain said body on such a neck, said flange means further including a spaced pair of substantially radially-arranged walls peripherally spaced from the peripheral midpoint of said finger by approximately 90° and defining a guideway therebetween, a latch element received and guided in said guideway for limited radial movement relative to said body, at least one of said walls carrying, adjacent its lowermost edge, a finger projecting toward the other of said walls and engaging said latch element to retain the same in said guideway, spring means housed between said walls and resiliently urging said latch means in the direction of extension of said finger, and manually manipulable means operatively associated with said latch element and accessible from outside said cap body, whereby retrograde turning movement of said cap will be arrested until said latch element is manually retracted.

5. A closure cap comprising a cap body having a downturned, perimetral flange, said flange being formed to define a pair of diametrically-opposed, radially-outwardly projecting ears, a pair of diametrically-opposed, inturned retainer fingers located adjacent the distal edge of said flange and substantially midway between said ears, said retainer fingers being engageable, upon turning movement, with a conventional filler neck lip to retain said body on such a neck, a latch element supported from said body and disposed at least partially within one of said ears for limited radial movement relative to said body, spring means within said one ear, engaging said latch element and yieldably resisting radially outward movement thereof, and manually manipulable means operatively associated with said latch element and accessible from outside said cap body, whereby retrograde turning movement of said cap will be arrested until said latch element is manually retracted.

References Cited in the file of this patent

UNITED STATES PATENTS

| | | |
|---|---|---|
| 2,513,350 | Nelson | July 4, 1950 |
| 2,968,421 | Eshbaugh | Jan. 17, 1961 |
| 2,990,971 | Enell | July 4, 1961 |